W. H. COOK.

Horse Hay-Rake.

No. 82,292.

Patented Sept. 22, 1868.

UNITED STATES PATENT OFFICE.

WILLIAM H. COOK, OF BRIDGEHAMPTON, NEW YORK.

IMPROVEMENT IN HORSE-RAKES.

Specification forming part of Letters Patent No. 82,292, dated September 22, 1868.

*To all whom it may concern:*

Be it known that I, WILLIAM H. COOK, of Bridgehampton, in the county of Suffolk and State of New York, have invented a new and useful Improvement in Horse Hay-Rakes; and I do hereby declare that the following is a full, clear, and exact description thereof, which will enable others skilled in the art to make and use the same, reference being had to the accompanying drawings, forming part of this specification, in which—

Figure 1:
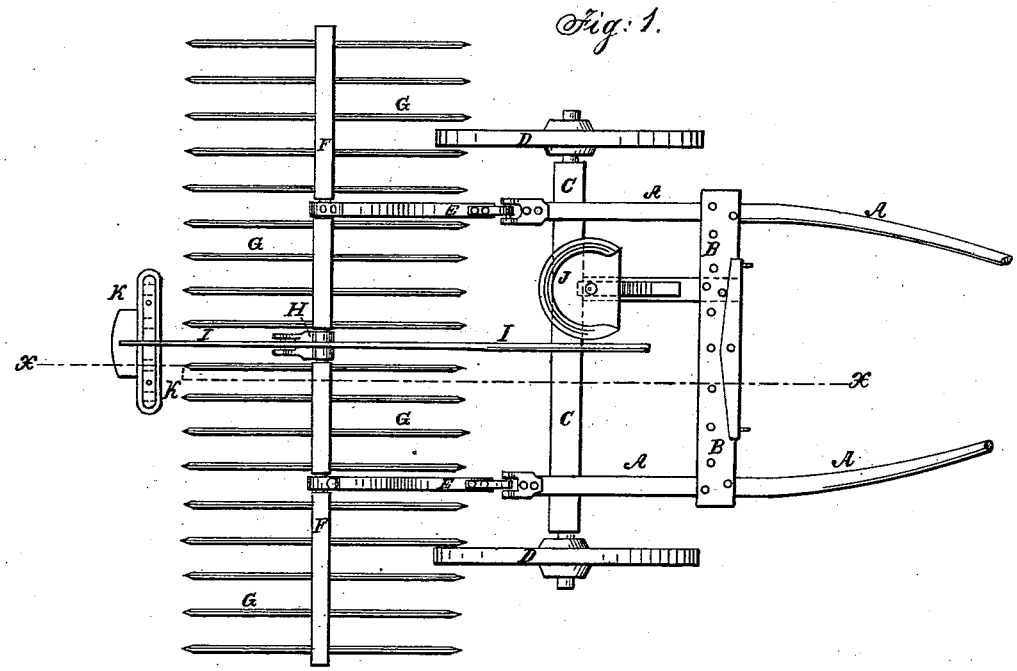
Figure 2:
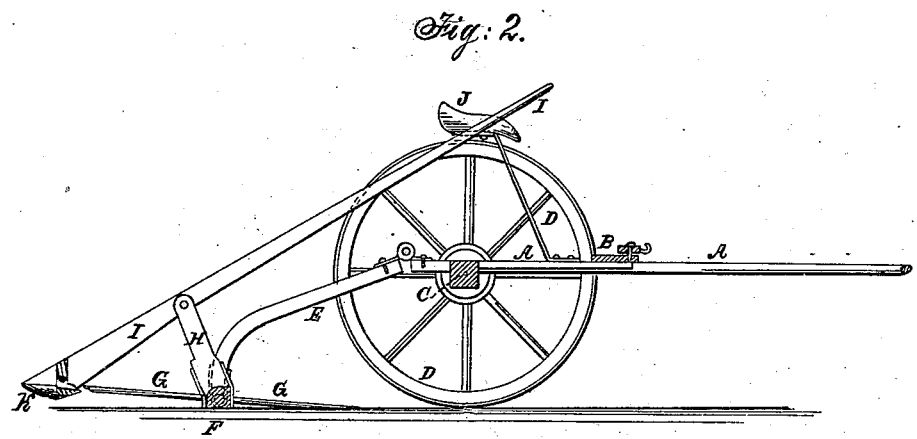

Figure 1 is a top or plan view of my improved rake. Fig. 2 is a detail cross-section of the same, taken through the line $x\ x$ of Fig. 1.

Similar letters of reference indicate like parts.

My invention has for its object to improve the construction of revolving horse hay-rakes, so as to make them more effective and convenient in operation than when constructed in the ordinary manner; and it consists in the combination of a standard, lever, and perforated shoe with the revolving rake-head, as hereinafter more fully described.

A are the shafts, B is the cross-bar, C is the axle, and D are the wheels, which form the body or truck of the rake, and about the construction of which parts there is nothing new. E are the draft-bars of the rake-head, the forward ends of which are hinged to the rearwardly-projecting ends of the thills or shafts A or to the axle C, as shown in Figs. 1 and 2. The rear parts of the draft-bars E are curved downward, and their rear ends are connected with the shaft F of the rake-head in the usual manner—that is to say, by straps, the middle parts of which pass around the said shaft F, and the ends of which are attached to the said draft-bars E, as shown in Figs. 1 and 2.

G are the rake-teeth, which are passed through the shaft F in the usual manner. H is a standard, the lower end of which is connected with the middle part of the shaft F of the rake-head by a strap passing around the said shaft and attached to the said standard, so that the rake-head may revolve upon the end of the said standard, and so that the upper end of the said standard may be moved back and forth or oscillated upon said shaft, as required.

To the upper end of the standard H is pivoted the lever I, the forward end of which extends forward into such a position as to be conveniently reached and operated by the driver from his seat J.

To the rear end of the lever I is attached a shoe, K, having holes or openings formed in it to receive the ends of the rake-teeth G, so that the rake-head may be controlled by operating the lever I.

By this construction, by lowering the forward end of the lever I, the teeth G will be so inclined that their forward ends will catch upon the ground. Then, by pushing the lever back, the shoe K will be slipped from the teeth G, allowing the rake-head to revolve, depositing the collected hay in a windrow. As the rake-head revolves, the lever I is drawn forward, so that the shoe K may strike against the teeth G as they come up. Then, by pushing the lever I back till the shoe K drops from the ends of the teeth G, and again drawing it forward, the ends of the said teeth will again pass into the holes or openings of the shoe K. By raising the forward end of the lever I, the rake-head F G will be raised, enabling the rake to pass over obstructions.

Having thus described my invention, I claim as new and desire to secure by Letters Patent—

The combination of the standard H, lever I, and perforated shoe K with the rake-head F G, substantially as herein shown and described, and for the purpose set forth.

WILLIAM H. COOK.

Witnesses:
GEO. B. BROWN,
JAMES T. JENNINGS.